2,903,410

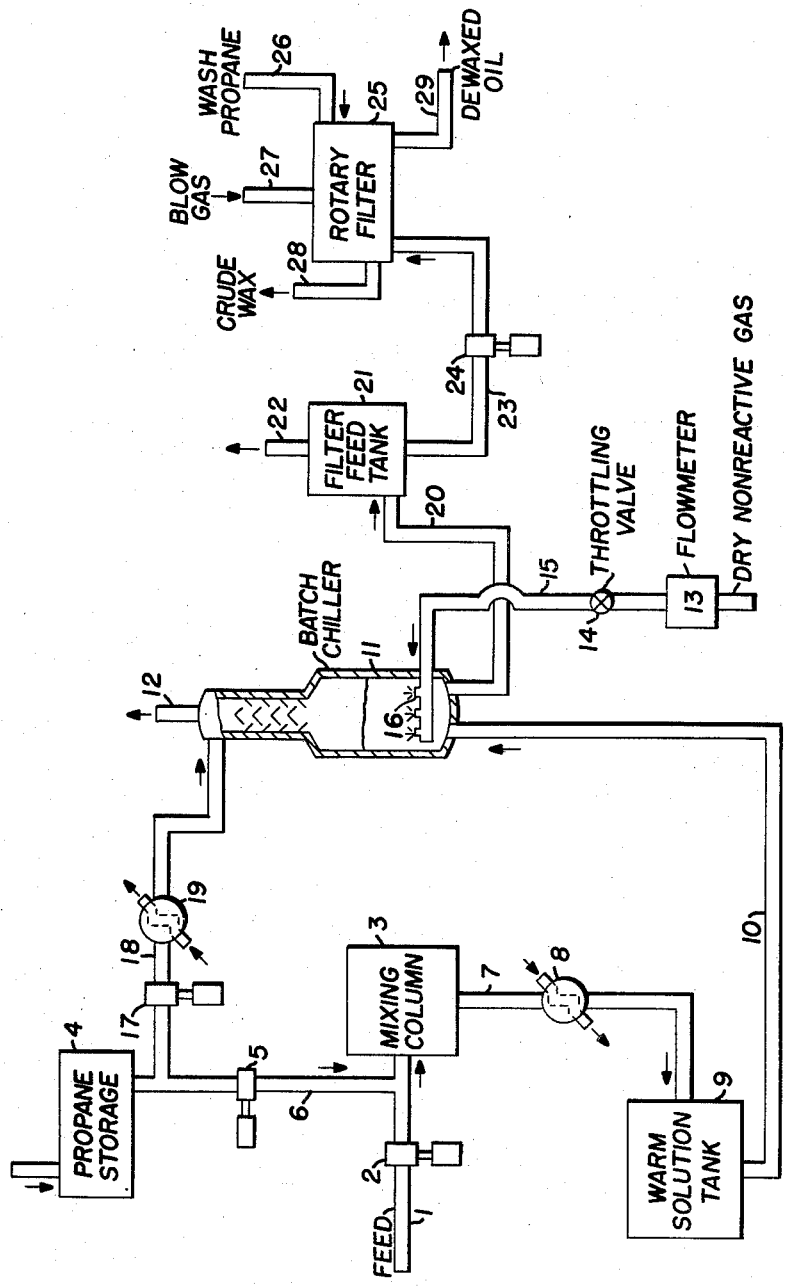

SOLVENT DEWAXING PROCESS WHEREIN A CRITICAL AMOUNT OF INERT GAS IS BUBBLED THROUGH THE COOLING ZONE SO AS TO IMPROVE SUBSEQUENT FILTRATION

Walter M. Basch, Rumson, N.J., assignor to Esso Research and Engineering Company, a corporation of Delaware Application April 9, 1956, Serial No. 576,967

6 Claims. (Cl. 208—35)

The present invention relates to an improved process for the mnaufacture of waxes and more particularly to an improved solvent dewaxing process which permits more rapid separation of waxes from petroleum oils. In accordance with the invention a non-reactive gas is introduced into the chiller of a solvent dewaxing process during the chilling step to promote the formation of improved wax crystals which can be more readily filtered.

For the separation of wax from hydrocarbon oils the use of solvent dewaxing processes utilizing autorefrigeration is well known in the art. In these processes an oil which is to be dewaxed is mixed with solvent in which wax is insoluble and the resulting solution is cooled by the evaporation of solvent until wax crystals are precipitated from solution. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly, reducing the filtration rate and eventually necessitating shut-down of the filters for removal of the accumulated wax. Very large crystals tend to form gel-like interlocking masses which do not form a compact filter cake, which contain large amounts of oil and solvent, and which are difficult to wash. Various means have therefore been suggested for controlling the size and shape of wax crystals in order to obtain optimum filter rates. These include regulation of the chilling rate, the use of filter aids and crystallization regulators, the incremental addition of solvent during the chilling step, and the addition of auxiliary refrigerants to the chiller.

In accordance with the present invention a substantial improvement in the filtration rate of the slurry produced during a solvent dewaxing process using a solvent containing up to 6 carbon atoms per molecule is obtained through the agitation of the slurry during the chilling period by the introduction of a critical amount of a non-reactive gas. The normal boiling of the solvent during dewaxing produces agitation, but not uniformly. The introduction of a critical amount of gas produces a uniform agitation over the entire chilling cycle, especially at low temperatures. It prevents supersaturation of the solvent and permits a uniform chilling rate. Without gas agitation, at temperatures below 0° F. the boiling ceases and evaporation takes place only at the surface of the slurry. Super-cooling therefore takes place at the surface and periodically violent eruptions occur which break up the wax crystals and also cause entrainment of oil in the solvent vapor which is carried to the compressors. The agitation thus influences the crystalline structure of the precipitating wax and produces crystals which can readily be separated by filtration. It also eliminates the "bumping" which normally occurs during the chilling cycle.

The gas utilized in the present invention is one having a boiling temperature well below that of the dewaxing solvent so that condensation of the gas does not occur within the chiller. The gas is introduced in gaseous form to avoid the additional chilling which would occur if it were introduced as a liquid and allowed to vaporize. The gas should be substantially non-reactive with the oil and solvent and should not be appreciably soluble in either. Suitable gases include carbon dioxide, methane and nitrogen. Air may also be used under certain circumstances but this would ordinarily be undesirable in a full scale operation because of the explosive hazard created when a highly volatile solvent is mixed with air. Of course if the solvent is non-inflammable, air would be a preferred gas.

The amount of gas admitted to the chiller during the chilling step must be maintained within critical limits in order to obtain substantially improved slurry filtration rates. Excessive agitation has been found to cause breakdown of the wax crystals, resulting in decreased slurry filtration rates. Insufficient agitation does not promote the uniform crystals necessary for improved filtration. Because the pressures and temperatures in the chiller during the chilling step are continually changing, it is impractical to express this criticality in terms of gas flow rates. The chiller pressure may range between about 400 p.s.i.g. and atmospheric, for example, and the temperatures may range between about 160° F. and —35° F. It has therefore been found more feasible to express the amount of gas to be used over the entire chilling step, considered at standard conditions, as a percentage of the amount of vapor removed from the chiller during chilling, considered at standard conditions. It has been discovered that the introduction over the entire chilling period of gas in an amount equal in volume to 0.5% to 1.5% of the total solvent vapor removed from the chiller during chilling results in the formation of wax crystals which permit slurry filtration rates substantially in excess of those possible when greater or lesser amounts of gas are used or where no gas is used. The volume of solvent evaporated is determined stoichiometrically and the gas volume is measured by a flowmeter.

The dry gas is stored under pressure and introduced into the chiller during the chilling period through a throttling valve at a pressure slightly in excess of the chiller pressure. A pressure differential of approximately 2 to 3 p.s.i.g. is maintained in order to prevent backflow and to force the gas to bubble up through the slurry. The gas is released into the slurry through a perforated sparge located at the bottom of the chiller. Alternatively, nozzles, sintered metal disks, or other distribution means may be employed.

The present invention can perhaps be best understood by referring to the accompanying drawing, which depicts the chilling and filtration steps of a typical propane dewaxing process. It will be understood that the invention is not thereby limited to propane dewaxing and that is may be incorporated into other dewaxing processes employing light hydrocarbon solvents containing up to six carbon atoms per molecule in which autorefrigeration is used.

A wax-containing hydrocarbon fraction which is to be dewaxed is introduced into the process by means of line 1 and pump 2. This hydrocarbon fraction may be a distillate fraction boiling in the range of about 575° F. to 900° F. if paraffin wax is to be produced or may be a heavier fraction boiling above 900° F. if microcrystalline wax is to be produced. A typical fraction for the production of paraffin wax might be a waxy distillate having a viscosity of about 75 Saybolt Universal seconds at 210° F. and derived from East Texas crude. Liquid propane, stored under a pressure in the range of about 350 to 450 p.s.i.g. in storage tank 4, is pumped by pump 5 through line 6 and introduced into the hydrocarbon stream in line 1 just before the said stream is introduced into mixing column 3. The liquid propane and hydrocarbon fraction are introduced into mixing column 3 through line 1 and are thoroughly mixed by means of conventional mechanical agitators, which are not shown. The amount of propane to be mixed with the oil varies with the viscosity of the feed stock and normally ranges between 1.5 volumes to 3.5 volumes per volume of feed. Lighter feeds require less propane.

The solution of oil and propane is conducted from mixing column 3 through line 7 to heat exchanger 8, where it is heated to a temperature ranging between about 130° F. and 150° F., preferably about 140° F., and thence into warm solution tank 9, where it is stored for introduction into the chilling step of the process. The warm solution of propane and oil is fed from the warm solution tank 9 through line 10 alternately into one of two batch chillers 11 at a temperature of approximately 90° F. and a pressure of approximately 150 p.s.i.g. Only one batch chiller is shown in the drawing but it will be understood that at least two chillers must be used to assure continuity of operation.

The chilling of the solution and oil takes place in insulated chiller 11 which is equipped with a means for withdrawing vapor therefrom and thereby regulating the pressure therein. The chiller is preheated to the temperature of the solution of propane and oil in the warm solution tank 9, about 90° F., before the oil-propane solution is admitted. This preheating is necessary to prevent shock cooling of the solution and the precipitation of very fine crystals which are difficult to filter. The preheating line is not shown.

After the solution has been introduced into the preheated chiller 11, the chiller pressure is gradually reduced by the withdrawal of vapor through line 12. The decrease in pressure causes liquid propane to evaporate from the solution, thereby cooling the solution. The dilution of the solution is maintained by the addition of make-up liquid propane from the propane storage drum 4 through pump 17, line 18, and heat exchanger 19. Shock cooling of the chiller solution is again avoided by bringing the make-up propane to approximately chiller temperature in heat exchanger 19.

As the pressure within the chiller is reduced, dry gas is introduced into the bottom of the chiller when the temperature is between 20 and 50° F. through flowmeter 13, throttling valve 14, line 15 and distribution plate 16 and allowed to bubble up through the solution, causing agitation. The gas is admitted at a pressure slightly in excess of that in the chiller in order to prevent backflow and clogging. Usually a pressure differential of from 2 to 3 p.s.i.g. is sufficient. The gas must be dried before it is introduced in order to prevent the formation of ice. Conventional gas drying means, such as the use of silica gel or calcium chloride, may be used for this. The gas flow is controlled by throttling valve 14 as the pressure within the chiller is decreased in order to prevent gas surging and excessive agitation. As the solution is cooled and agitated, crystals of wax are precipitated, forming a slurry of wax crystals, oil and liquid propane in the chiller.

The total amount of dry gas added to the chiller during the chilling period must be between 0.5 and 1.5 percent by volume, under standard conditions of the amount of vapor evaporated from the chiller over the chilling period, taken at standard conditions, in order for the structure of the crystals to be such that substantially improved slurry filtration rates are obtained. In the case of propane dewaxing with a propane-to-oil ratio of 1.5 to 1 this is equivalent to from 30% to 75% of the slurry volume but, because the propane to oil ratio varies with various oil feeds, the gas to slurry volume ratio is not a practical standard.

The chilling rate during the process is carefully controlled so that the initial rate is approximately 7° F. per minute. This is gradually decreased during the chilling so that the final rate is about 2° F. per minute or less. The complete chilling cycle normally takes from 30 to 35 minutes. While the wax crystals are being precipitated from solution in one chiller, the other chiller is being emptied, preheated and refilled with solution from the warm solution tank. This permits chilling to be carried on continuously.

Upon completion of the precipitation of the wax crystals in chiller 11, the slurry of wax, oil and liquid propane is discharged from the chiller through line 20 into filter feed tank 21. This slurry is at a temperature of about −35° F. and approximately atmospheric pressure. The temperature and pressure level is maintained by the withdrawal of propane vapor from the filter feed tank through line 22. The cold slurry is pumped from the feed tank through line 23 by pump 24 into rotary filter 25.

The rotary filter 25 is of the pressure type and is operated with a pressure in the filter housing of about 5 p.s.i.g. in order to provide the pressure differential necessary for filtration. Crude wax is filtered from the slurry, washed with cold propane supplied through line 26, blown with cold propane gas supplied through line 27, and discharged into trough 28. The dewaxed oil and solvent are discharged from the filter through line 29. It is generally desirable to use more than one filter in order to achieve a balanced process.

Following the filtration operation the crude wax is further processed for the removal of additional oil and solvent in conventional equipment not shown in the drawing and then further refined. The dewaxed oil and solvent are separated by conventional evaporation and stripping operations not shown. The solvent is then re-recycled to propane storage for reuse in the process and the dewaxed oil is sent to other refinery process, such as the manufacturing of lubricating oil.

It is to be understood that the invention is not limited to the specific arrangement of equipment disclosed above to illustrate one form of the invention and that the principles disclosed may be embodied in other solvent dewaxing processes.

To further illustrate the invention and to demonstrate the criticality of the amount of gas introduced during the chilling step of the process, a bench scale solvent dewaxing process was carried out using hexane as the solvent and air as the gas. Hexane was selected as a solvent because its volatility is sufficiently low to permit carrying out the process without extensive high pressure equipment. Hexane dewaxing corresponds very closely to propane dewaxing and data obtained by using hexane are fully applicable to a process wherein propane is used. Similarly, the use of air rather than carbon dioxide, methane or nitrogen does not effect the validity of the data thereby obtained. The results obtained in applying the present invention to a bench scale dewaxing process are set forth in the following table.

Table I

| RUN NO | 1[1] | 2 | 3 | 4 | 5 | 6 | 7 | 8 | 9 | 10 | 11 | 12 | 13 |
|---|---|---|---|---|---|---|---|---|---|---|---|---|---|
| Feed | [2] | [2] | [2] | [2] | [2] | [2] | [2] | [2] | [2] | [2] | [2] | [2] | [2] |
| Wax content, percent | 18 | 18 | 18 | 18 | 18 | 18 | 18 | 18 | 18 | 18 | 18 | 18 | 18 |
| Solvent ratio | 1.5/1 | 1.5/1 | 1.5/1 | 1.5/1 | 1.5/1 | 1.5/1 | 1.5/1 | 1.5/1 | 1.5/1 | 1.5/1 | 1.5/1 | 1.5/1 | 1.5/1 |
| Chilling rate[3] | [4] | [4] | [4] | [4] | [4] | [4] | [4] | [4] | [4] | [4] | [4] | [4] | [4] |
| Air, vol. percent of vapors | None | 0.35 | 0.5 | 0.5 | 0.55 | 0.74 | 0.74 | 1.0 | 1.0 | 1.0 | 1.5 | 2.0 | 6.0 |
| Results without wash: | | | | | | | | | | | | | |
| Dewaxed oil yield, percent | 68 | 62 | 65 | 67 | 65 | 66 | 65 | 65 | 64 | 64 | 67 | 66 | 66 |
| Primary filter rate (gals. dewaxed oil/hr./ft.[2]) | 11.4 | 10.6 | 17.5 | 17.0 | 14.4 | 14.2 | 16.5 | 21.6 | 20.6 | 20.5 | 17.0 | 11.8 | 11.7 |
| Results with wash: | | | | | | | | | | | | | |
| Dewaxed oil yield, percent | 81 | 79 | 80 | 79 | 80 | 79.5 | 80 | 80 | 78 | 81 | 80 | 80 | 81 |
| Total filter rate (gals. dewaxed oil/hr./ft.[2]) | 13.9 | 12.6 | 21.3 | 20.4 | 17.6 | 18.2 | 20.2 | 25.4 | 24.6 | 27.2 | 20.0 | 16.2 | 15.3 |

[1] This represents an average of four runs.
[2] Barosa 56#2—A fraction distilled from North Louisiana-Rodessa crude in the temperature range 600° F. to 900° F. having a viscosity of 56 Saybolt Universal seconds at 210° F.
[3] Cooled from 150° to 50° F. at 7°/minute, from 50° to 0° F. at 4°/minute, and from 0° to −32° F. at 2°/minute.
[4] 7/4/2°F./min.

From the foregoing data it can be seen that the use of gaseous agitation during the chilling step of a solvent dewaxing process makes possible substantially improved slurry filter rates. Where a volume of gas equal to 1% of the withdrawn vapor under standard conditions was added during chilling, there was an average improvement in the total filter rate of 85% over the average rate obtained when no gas was added. Corresponding improvements were noted when gas was added in amounts ranging between 0.5% and 1.5% of the vapor evaporated. Similarly, the data show that 0.5% and 1.5% by volume of the withdrawn vapor are critical limits and that the addition of gas in greater or lesser amounts does not lead to substantial improvement in the slurry filter rate. Filtration rates in commercial propane dewaxing plants range between 3 and 5 gals. of dewaxed oil per hour per sq. ft. of filter area and it is therefore apparent that the present invention makes possible significant improvements in solvent dewaxing.

The invention may be used by itself to improve slurry filter rates or may be used in conjunction with other methods for regulating the size and shape of wax crystals in solvent dewaxing. Thus, filter aids or crystallization regulators may be added to the oil before it is mixed with the solvent at the start of the dewaxing process.

What is claimed is:

1. An improved solvent dewaxing process which comprises dissolving a wax-containing hydrocarbon oil in a liquefied normally gaseous dewaxing solvent, introducing the oil-solvent solution into a chilling zone, reducing the pressure in said chilling zone and evaporating solvent from said solution to effect chilling, injecting into said solution through a distribution device in the bottom of said chilling zone during chilling from about 0.5 to about 1.5 standard cubic feet of a dry non-reactive gas per 100 standard cubic feet of evaporated solvent vapor, withdrawing a slurry containing wax crystals from said chilling zone, and separating said crystals from said slurry.

2. A process as defined by claim 1 wherein said dewaxing solvent is liquefied propane.

3. A process as defined by claim 1 wherein said non-reactive gas is carbon dioxide.

4. In a propane dewaxing process wherein a wax-containing petroleum fraction is diluted with liquefied propane and wax crystals are precipitated from the resulting solution by autorefrigeration in a chilling zone, the improvement which comprises injecting through a distribution device in the bottom of said chilling zone during precipitation of said wax crystals from about 0.5 to about 1.5 standard cubic feet of a dry non-reactive gas per 100 standard cubic feet of propane gas evaporated during said precipitation.

5. The improvement defined by claim 4 wherein said non-reactive gas is methane.

6. The improvement defined by claim 4 wherein said non-reactive gas is nitrogen.

References Cited in the file of this patent

UNITED STATES PATENTS

| 2,164,773 | Knowles | July 4, 1939 |
| 2,202,542 | Voorhies | May 28, 1940 |